(12) United States Patent
Tobin

(10) Patent No.: US 7,243,340 B2
(45) Date of Patent: Jul. 10, 2007

(54) METHOD AND SYSTEM FOR OBFUSCATION OF COMPUTER PROGRAM EXECUTION FLOW TO INCREASE COMPUTER PROGRAM SECURITY

(75) Inventor: John P. E. Tobin, San Jose, CA (US)

(73) Assignee: Pace Anti-Piracy, San Jose, CA (US)

( * ) Notice: Subject to any disclaimer, the term of this patent is extended or adjusted under 35 U.S.C. 154(b) by 994 days.

(21) Appl. No.: 10/003,376

(22) Filed: Nov. 15, 2001

(65) Prior Publication Data
US 2003/0093685 A1      May 15, 2003

(51) Int. Cl.
    *G06F 9/44*    (2006.01)
(52) U.S. Cl. .................................... 717/130
(58) Field of Classification Search ........ 717/124–131; 714/15, 25, 30–38; 703/21, 22, 26; 718/102–103
See application file for complete search history.

(56) References Cited

U.S. PATENT DOCUMENTS

| | | | | |
|---|---|---|---|---|
| 4,910,663 A | * | 3/1990 | Bailey | 714/34 |
| 5,450,586 A | * | 9/1995 | Kuzara et al. | 717/124 |
| 5,630,049 A | * | 5/1997 | Cardoza et al. | 714/25 |
| 5,745,770 A | * | 4/1998 | Thangadurai et al. | 710/260 |
| 5,790,846 A | * | 8/1998 | Mealey et al. | 712/244 |
| 5,889,988 A | * | 3/1999 | Held | 718/103 |
| 5,963,737 A | * | 10/1999 | Mealey et al. | 712/244 |
| 6,247,169 B1 | * | 6/2001 | DeLong | 717/131 |
| 6,708,326 B1 | * | 3/2004 | Bhattacarya | 717/124 |
| 6,754,851 B2 | * | 6/2004 | Yoshimura | 714/38 |
| 6,842,893 B1 | * | 1/2005 | Sangavarapu et al. | 717/129 |

OTHER PUBLICATIONS

Hagimont et al., "Hidden Software Capabilities", Proceedings of the 16 International Conference on Distributed Systems, May 1996, pp. 1-14.*

* cited by examiner

*Primary Examiner*—Tuan A. Vu
(74) *Attorney, Agent, or Firm*—Strategic Patent Group, P.C.

(57) ABSTRACT

A method and system for increasing security of a software program by obfuscation of program execution flow is disclosed, wherein the software program is executed on a computer system that includes a user-level protected mode and a kernel-level unprotected mode. The method and system include first identifying critical code segments to be hidden in the software program. The non-critical portions of the software program are then executed in the user-level protected mode, while the critical code segments are executed within respective exception handlers, thereby hiding execution of the critical code segments from a debugger program.

39 Claims, 12 Drawing Sheets

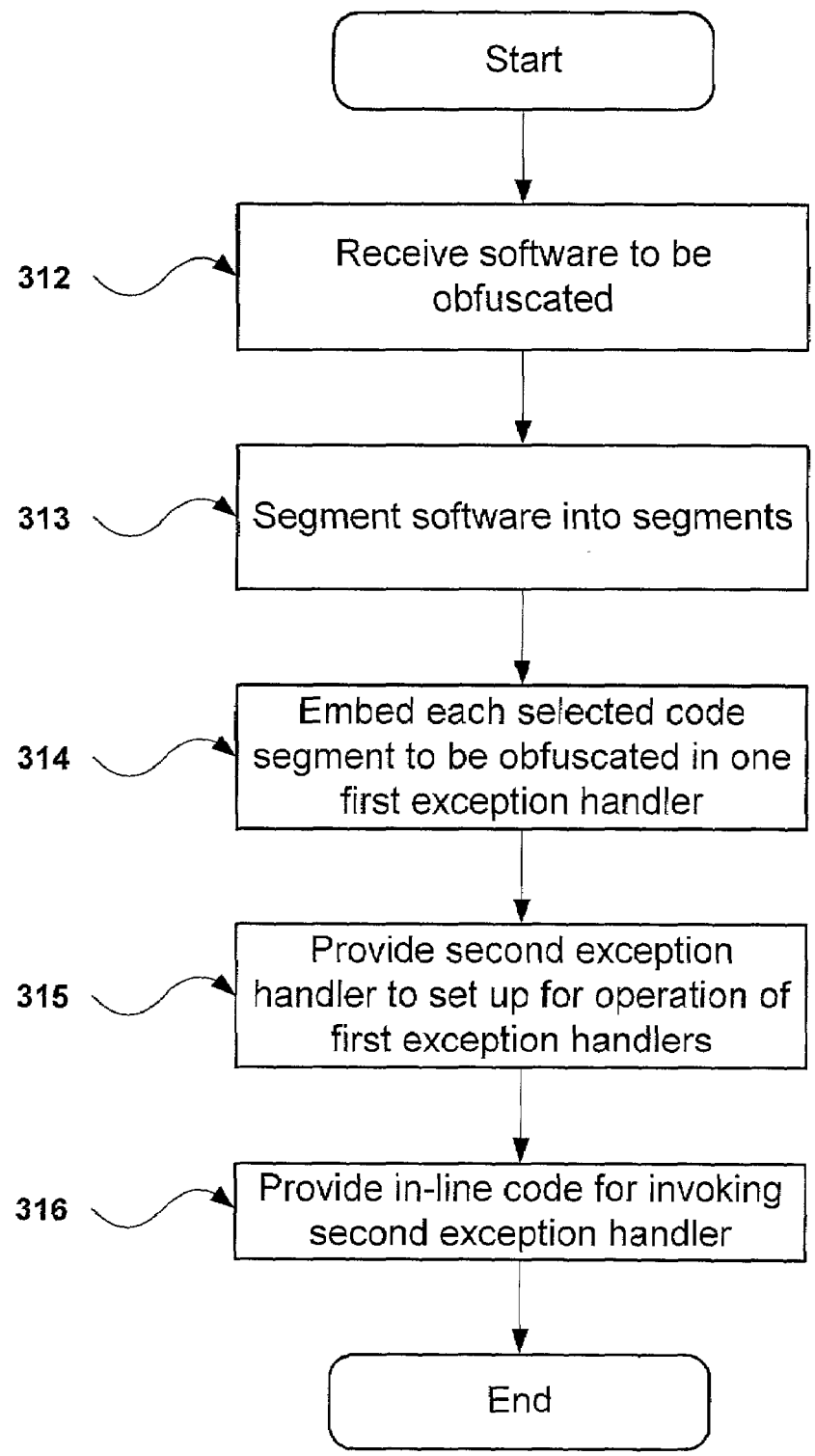

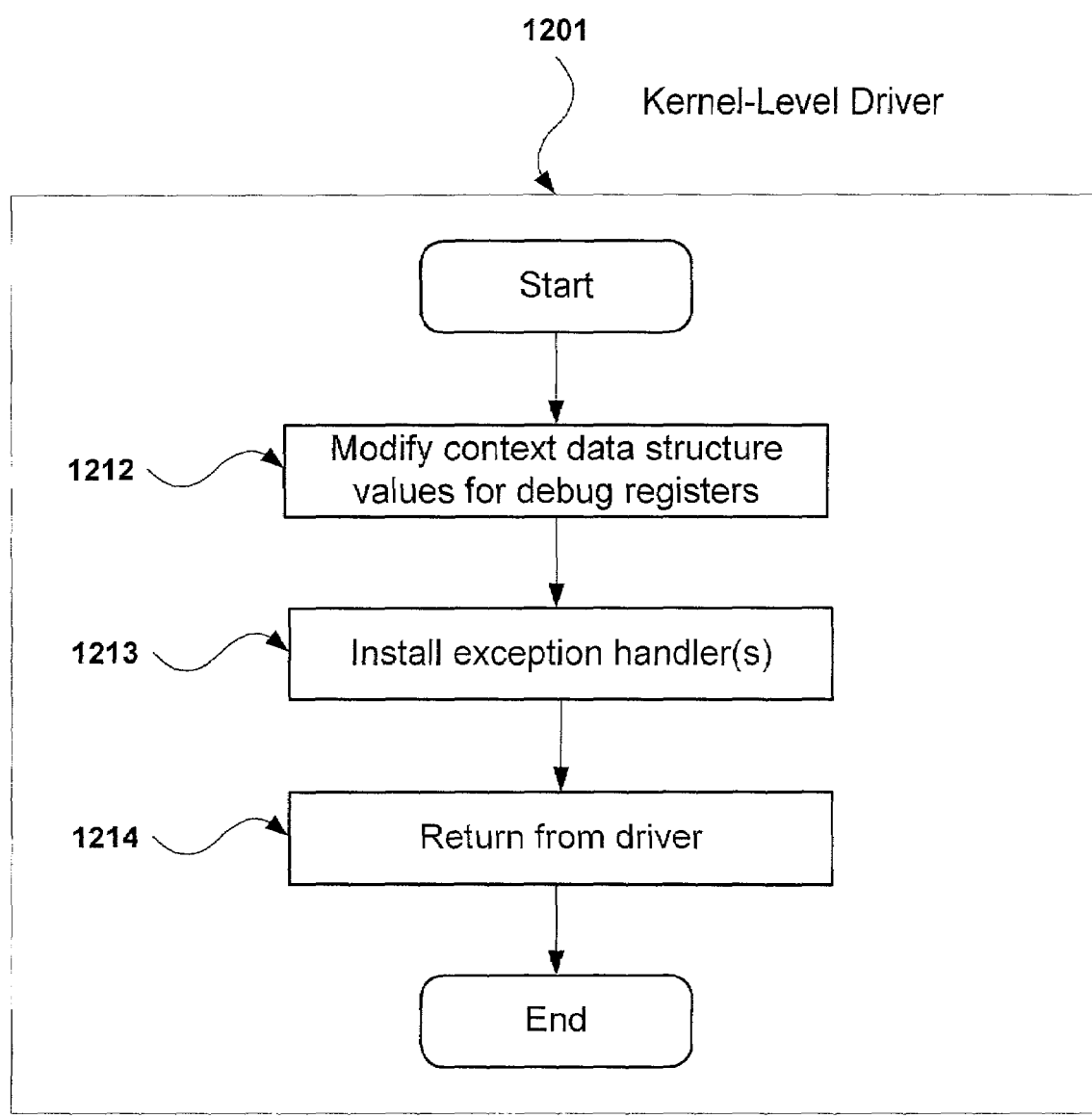

METHOD AND SYSTEM FOR OBFUSCATION OF COMPUTER PROGRAM EXECUTION FLOW TO INCREASE COMPUTER PROGRAM SECURITY

FIELD OF THE INVENTION

The present invention relates generally to software copy protection, and more particularly to increasing the security of a software program by making it more difficult for a hacker to break the program anti-piracy features for the purpose of distributing copies for free or without remuneration to the program copyright owners, and/or to increase the difficulty in reverse engineering the software program.

BACKGROUND OF THE INVENTION

One of the biggest issues facing the content industry, such as music, video, and software industries, is the illegal copying of their copyrighted works. This factor contributes to the loss of billions of dollars of income to the artist or author of the copyrighted works and their publishers and distributors every year. Many approaches to reducing the severity of this problem have been implemented and used, with varying amounts of success.

In the software industry, these methods are typically referred to as anti-piracy methods. These methods can include copy protection schemes, as well as methods for restricting the execution of a software program by use of various encryption and licensing schemes. For example, there have been schemes used to prevent the copying of a floppy disk by various techniques that make it impossible to read the contents of the floppy disk using standard disk driver software. Only with special driver software can the floppy be actually read, usually with some difficulty, and the software contained on the floppy disk loaded and executed.

Some methods of restricting illegal copying of software includes imprinting the software with unique information about the system it is installed on, which prevents the program from running after being copied to another computer. An example if this is to use the hardware configuration of the system, such as which I/O cards are installed, and/or processor serial number to uniquely identify the authorized computer system on which the software is to run.

Another example is a method for licensing "seats" for the use of software. In this case, a license file—which can typically only be generated by the licensing authority—is sold along with the application program. The application program will refuse to operate without the presence of the license file, either on the local computer on which the software is to be run, or available over a network on a remote computer.

These efforts have been of limited success for high-demand horizontal market software programs, and more successful for programs with narrower, vertical markets, including software used by large businesses, and high value software for musicians or video engineers, for example. One case of high-demand horizontal market software is the computer game industry. In this case, the time between the release of a new, high consumer demand game and the availability of illegal copies can be a matter of hours. Thus, the amount of profit in selling the legal copies of the game is directly proportional to the time between initial release and the first available illegal copy. Many game companies would be significantly more profitable if this time could be extended to a mere day.

Software hackers use various software and hardware tools to understand and defeat anti-piracy mechanisms, including software debuggers and in-circuit emulator hardware (ICE). These tools must be taken into consideration when planning a successful mechanism for increasing the difficulty of breaking the anti-piracy features.

What is needed is a method and system for extending the time between the release of a software program and the time when an illegal copy is made available by making it more difficult for a hacker to break the anti-piracy mechanisms included within the software program, and/or to make it more difficult for a program to be reverse engineered. The present invention addresses such a need.

SUMMARY OF THE INVENTION

The present invention provides a method and system for increasing security of a software program by obfuscation of program execution flow, wherein the software program is executed on a computer system that includes a user-level protected mode and a kernel-level unprotected mode. The method and system include first identifying critical code segments to be hidden in the software program. The non-critical portions of the software program are then executed in the user-level protected mode, while the critical code segments are executed within respective exception handlers, thereby hiding execution of the critical code segments from a debugger program.

According to the method and system disclosed herein, the obfuscation of program execution flow hides key algorithms from view during debugging to increase the difficulty of reverse engineering, and therefore increases the difficulty of determining how to defeat the anti-piracy features of the software.

BRIEF DESCRIPTION OF THE DRAWINGS

FIG. 3 is a flow diagram of the method according to the present invention for obfuscating program execution flow.

FIG. 12 is a flow chart illustrating an alternate embodiment kernel-level driver to implement the functions of the in-line code segment and the exception set-up handler.

DETAILED DESCRIPTION OF THE INVENTION

Figure 1:
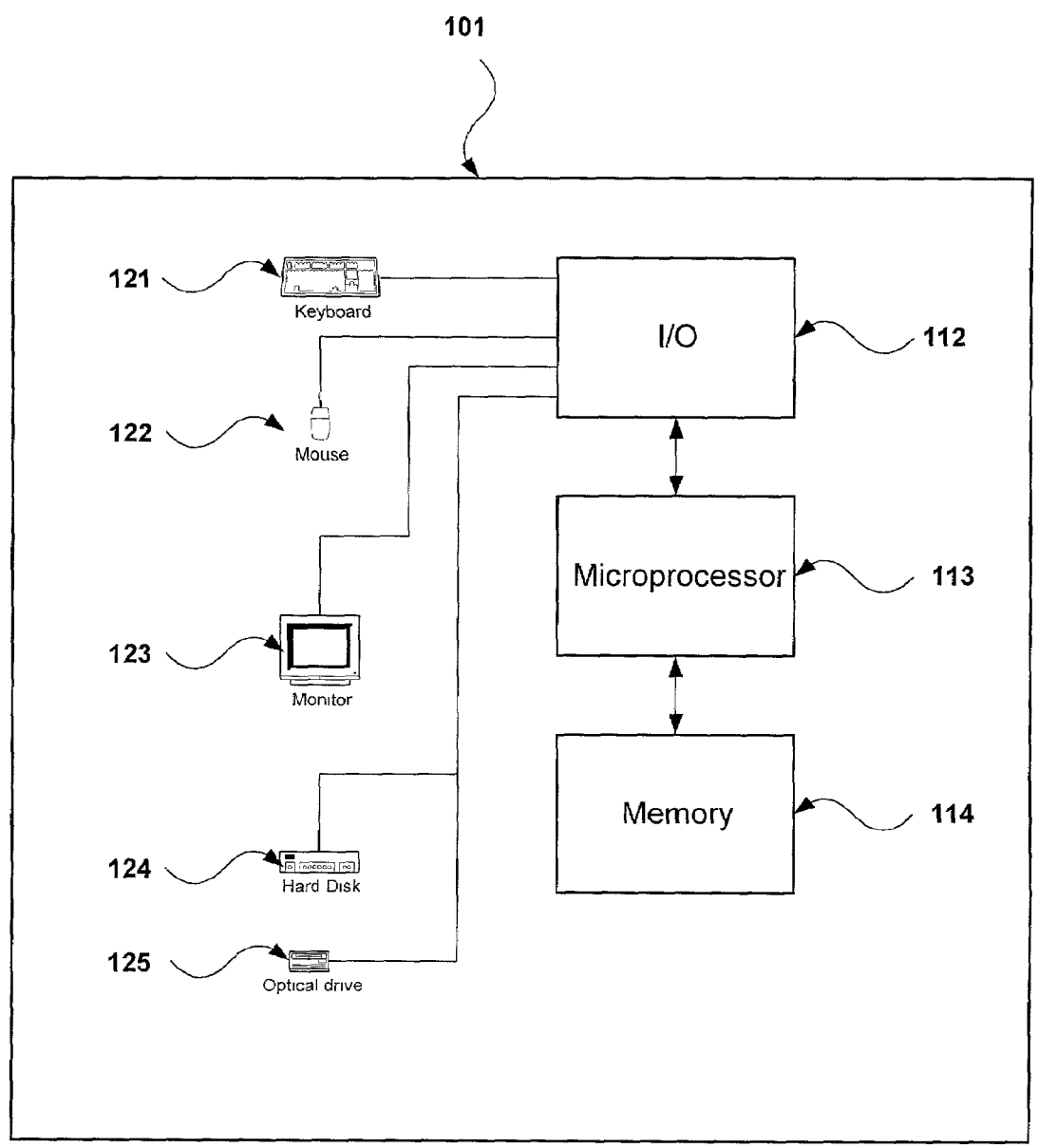
FIG. 1 is a block diagram of an example of a computer system in which the invention operates.

The present invention relates to a method and system for increasing the security of a computer software program. The following description is presented to enable one with ordinary skill in the art to make and use the invention and is provided in the context of a patent application and its requirements. Although the present invention will be described in the context of increasing software security by obfuscating program execution flow, various modifications to the preferred embodiments will be readily apparent to those with ordinary skill in the art and the generic principles herein may be applied to other embodiments. That is, any software could incorporate the features described herein below and that embodiment would be within the spirit and scope of the present invention. Thus, the present invention is not intended to be limited to the embodiments shown, but is to be accorded the widest scope consistent with the principles and features described herein.

The present invention is a method and system for increasing software program security by obfuscation of program execution flow. The present invention extends the time between the release of a software program and the time when an illegal copy of the software program is made available by hiding key algorithms from view to increase the difficulty of reverse engineering and to increase the difficulty of determining how to defeat the anti-piracy features in the software. This is accomplished by hiding the execution flow of selected portions of the program to be protected from a software debugger program when the debugger is run in an operating system that supports dual mode operation, i.e., user-mode (protected mode) and kernel-mode (unprotected mode). These modes are supported by the microprocessor hardware and operating system, and are well known to one with ordinary skill in the art.

Most debugger programs, which are typical tools used by software developers and hackers alike, are "user-level" debuggers. More powerful, complex, and costly "kernel-level" debuggers can also be utilized. The term "user-level" and "kernel-level" refers to the execution mode of the operating system. Specifically, a user-level debugger operates only with user-level "protected" mode of the code being executed by the microprocessor, and does not operate with kernel-level code used by the operating system and other kernel-level modules. A kernel-level debugger is additionally capable of operating with some difficulty and restrictions with kernel-level code.

The debugger is used to study the execution flow of a program, set software breakpoints, and analyze the contents of the microprocessor registers, data structures, and program variables at various points in the execution of a program. This process is normally associated with locating and correcting program errors during the development of a software program, and is referred to as "debugging" the software program. However, the same tool can be used to analyze the operation of any program, and thus is often used by hackers to determine the operation of a program they desire to make freely available. It can also be used to reverse-engineer software by helping an engineer extract key algorithms from a software program. Thus, by obfuscating the key areas of program execution from a debugger, the debugger will be unable to provide the desired information to the hacker or reverse engineer.

A software-only debugger is the most common type of debugger. However, there are more sophisticated tools available, as well. For example, an in-circuit emulator (ICE) is a computer hardware and software system with a hardware emulation capability that can monitor the operation of both kernel-level and user-level software. Typically, the ICE is plugged into the microprocessor socket, and replaces the microprocessor function for the computer being analyzed. However, such a computer system is typically significantly more expensive than a software-only debugger, and thus its use is much more restricted.

Other software tools are also available or can be created to attempt various types of monitoring to bypass whatever means are being applied to protect the software. It should be noted that standard PC, Macintosh, or Unix-based computer systems represent an unprotected environment, and thus there is no known way for absolute prevention of piracy or reverse engineering. However, by raising the difficulty level of discovery of the protection mechanisms high enough, one may achieve a satisfactory level of protection. Protection of this sort is typically a combination of many different methods, of which the present invention is one such method.

Referring now to FIG. 1, a block diagram of an example computer system 101 in which the present invention operates. Computer system 101 preferably comprises a microprocessor or CPU 113, a memory system 114, and input/output hardware 112. The input/output hardware 112 is preferably connected to a keyboard 121 for operator entry, a mouse or trackball 122 for cursor movements and control, a display monitor 123 for viewing the computer operation, a read/write non-volatile storage system such as a hard disk or flash memory 124, and removable memory 125 such as a floppy disk, optical disk, or removable flash card. Alternate embodiments of the I/O include replacing the keyboard 121 and mouse/trackball 122 with a touch-sensitive display, using either a pen or finger as pointing and selecting device (not shown), or using a microphone for speech control (not shown).

Figure 2:
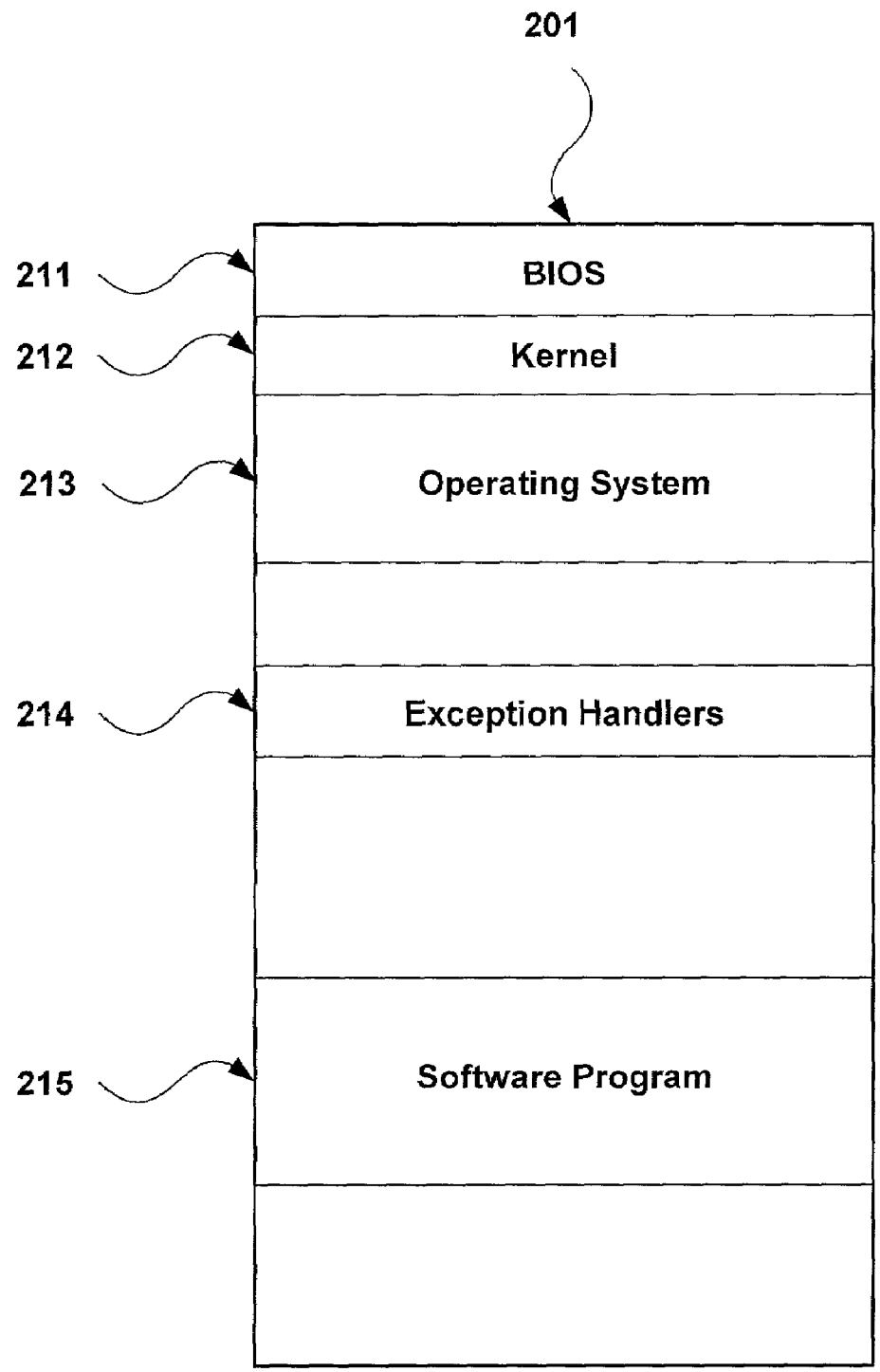
FIG. 2 is a block diagram of the invention within an example computer system memory.

Referring now to FIG. 2, a block diagram of the memory system 114 of computer system 101 showing the various components of the computer system software 201 is shown. This includes the basic I/O system (BIOS) 211, the Kernel 212, the Operating System 213, and the Exception Handlers 214.

As used herein, an exception handler is a routine designed to execute when an operating system exception occurs. The function of the exception handler is to take action to deal with the exception, such as corrective action, or to perform some specific operation. The exception itself is generated by specific code sequences, microprocessor errors (such as a "divide by zero" error), a software exception instruction, or via other microprocessor hardware functions, including debug functions. When the exception occurs, the processor enters the unprotected (kernel-level) mode, and executes kernel code to determine what routine to execute. When control is transferred to the exception handler, it is in protected (user-level) mode. When the exception handler completes execution, it returns control to the kernel, which operates again in unprotected mode. Finally, control is returned to the program, assuming that this is the intention of the exception handler, again in protected mode. While the actual exception handler code is executed at user-level, it is effectively cut off from view because of the bracketing kernel-level code that sets aside the entire exception handling process from view at the user-level. In other words, until control returns from the kernel back to the program, the execution is within the exception handling state of the kernel. According to an alternate embodiment of the present invention, a kernel-level driver may also be employed (not shown), as described below.

The program to be executed, Software Program 215, is typically loaded into the computer system 101 either for the purpose of using the program features to accomplish some work, for the purpose of reverse engineering its function, or for the purpose of defeating its anti-piracy features. The Software Program 215 may be loaded and installed via removable memory 125 with a CD-ROM disk, one or more floppy disks, a flash disk, or even by download via a wired or wireless modem, or a wireless or wired network connection (not shown). The Operating System 213 must support dual mode operation, i.e., user-mode (protected mode) and kernel-mode (unprotected mode) for the present invention to be successfully implemented. This is a standard feature of most if not all modern operating system, such as the Microsoft Windows Operating System™.

Once the Software Program 215 is installed, the user can invoke the installed Software Program 215, and the Software Program 215 will be loaded into memory 201 from disk 124. The Software Program 215 is typically responsible for loading the Exception Handlers 214, which are part of the software package. Next, the Software Program 215 will begin execution, and the operation of the present invention, if included in Software Program 215, will take place according to the description herein.

Alternately, if the user wishes instead to analyze the program for the purpose of debugging the program, or for purposes of reverse engineering or to defeat anti-piracy features, the appropriate debugging software (not shown) will be invoked, and commands will be issued by the user to the debugging software to load the Software Program 215 into memory 201 from disk 124.

According to the present invention, the security of the Software Program 215 is increased by obfuscating the execution flow of the program when the Software Program 215 is executed on the computer system 101 and analyzed by the debugger program. The execution flow of the Software Program 215 is obfuscated by identifying critical code segments in the Software Program 215 that need to be hidden, and then executing the non-critical portions of the Software Program 215 in the user-level protected mode, as normal, while the critical code segments are executed within respective exception handlers.

As described above, user-level debuggers are incapable of analyzing code executed within exception handlers kernel-level mode and will therefore be unable to provide information regarding the critical code segments of the Software Program 215 for a hacker to reverse engineer. As the user issues commands to the debugger to study the program execution flow of Software Program 215, the user may potentially set software breakpoints to reduce the time required to analyze the program flow. As described above, however, there will be sections of the program flow that will be invisible to the debugger. It will not be apparent to the user that pieces of code are missing, or where these missing pieces are located, or even where they are positioned within the program execution flow. Rather, the flow of microprocessor instructions will seem to progress smoothly, but unexpected, seemingly uncomputed results will appear from nowhere. Even worse, key registers in the microprocessor will be seen to suddenly change values, altering the program flow in unexpected ways, for no apparent reason. Data structures will appear and disappear, or change their contents with no clear connection to the program execution flow. Finally, program execution flow may appear to randomly jump from place to place for no apparent reason. It is important to note that these inconsistencies of operation will not be readily apparent, and specifically at what points in the program execution flow the changes take place will not be readily apparent.

Unless the user has access to much more sophisticated tools, it will be extremely difficult and time consuming to determine the cause of the unexpected operation of the software. Even if the user does have access to more sophisticated tools, the present invention will increase the effort and time necessary to analyze the operation of the program. For example, although kernel-level debuggers are capable of analyzing kernel-level code processing, most users of kernel-level debuggers deactivate the kernel-level exception processing when analyzing a program so that operating system code is not analyzed along the with the program. Even if kernel-level code is not deactivated, the user does not know where to look for the obfuscated code, or where exceptions will take place. Without this knowledge, hundreds of thousands of lines of operating system code may execute, including display, mouse, keyboard, and other system routines, before the key code described in the present invention is executed. It is the sheer volume of other kernel-level code that helps to obfuscate the code according to the present invention. Therefore, the critical code segments of the Software Program 215 will also be obscured from hackers who use kernel-level debuggers.

Figure 4A:
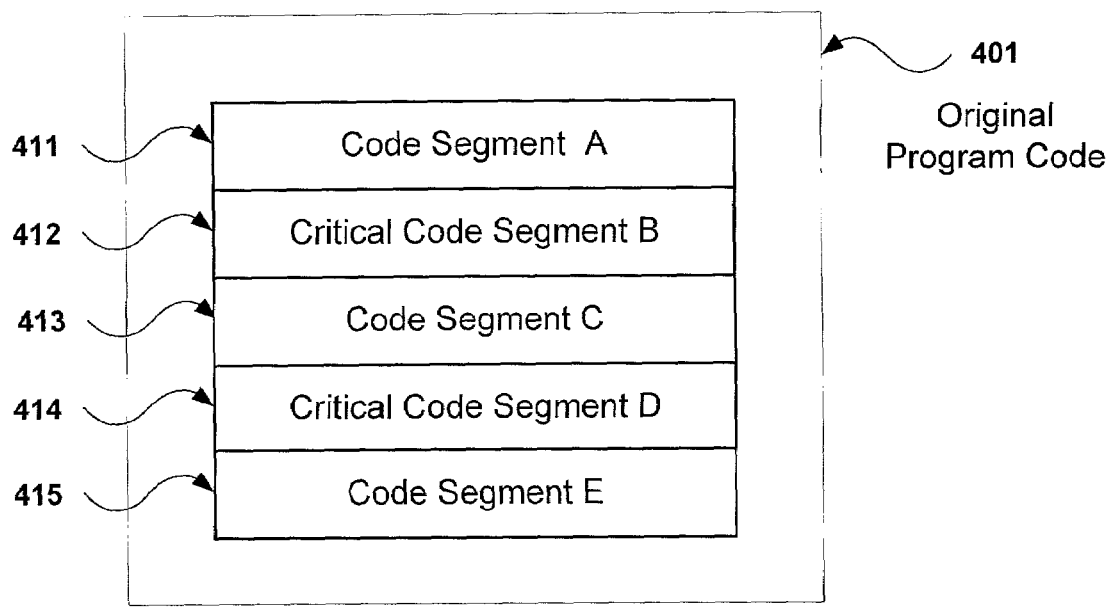
FIG. 4a is a block diagram of an example software program to be obfuscated according to the present invention

Referring now to FIG. 3, a flow chart illustrating the process for obfuscating program execution flow according to a preferred embodiment of the present invention is shown. The process of obfuscating program execution flow will be described in conjunction with FIGS. 4A and 4B. FIG. 4a is a block diagram of an example software program 401 to be obfuscated according to the present invention, and FIG. 4b is a block diagram of the resulting obfuscated software program 421 after the present invention has been applied.

Referring to both FIGS. 3 and 4A, the process begins in step 312 by receiving the software program 401 to be obfuscated, preferably in source code form. In step 313, the software 401 is broken up into a plurality of segments 411–415. This segmentation process includes identifying critical code segments 412, and 414 to be obfuscated for the purpose of obscuring key algorithms, or includes identifying segments with the goal of making it more difficult to determine the overall operation of the software 401 for the purpose of increasing the difficulty of breaking the anti-piracy protection mechanisms included in the software 401, or to hide critical segments of the anti-piracy code. There are many different ways to utilize this invention in this step, some of which will be described herein below. Segments 411, 413, and 415 represent the remaining segments of the software 401.

Figure 4B:
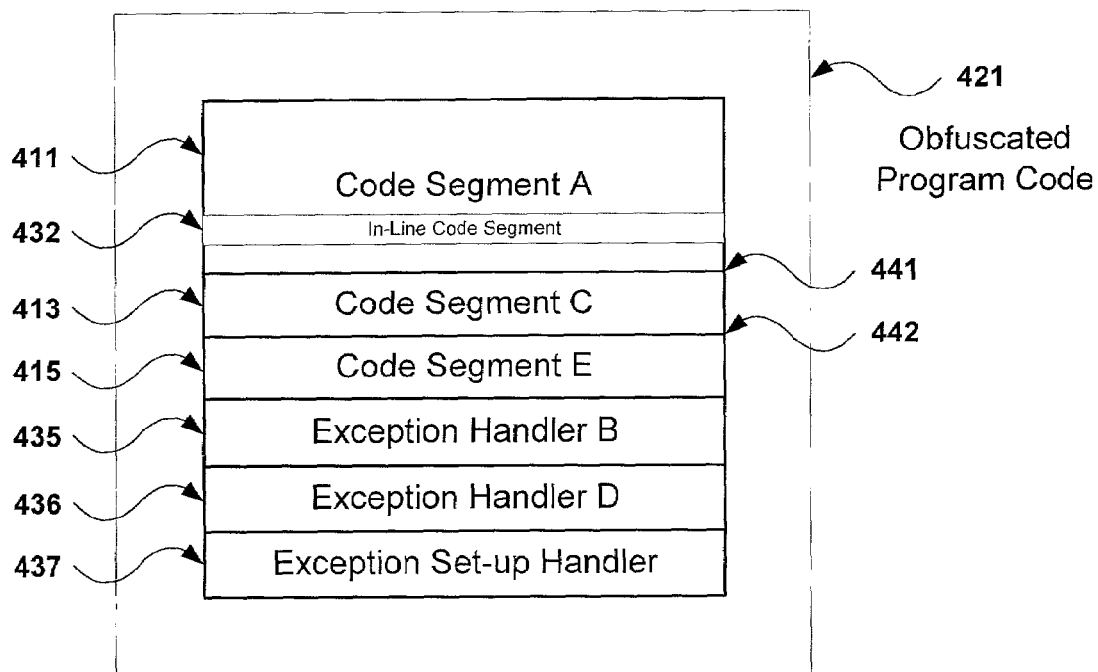
FIG. 4b is a block diagram of an example software program to be obfuscated after the present invention has been applied.

Referring to FIGS. 3 and 4B, in step 314, the obfuscated program 421 is created by removing the critical code segments 412 and 414 to be obfuscated and encapsulating them within newly created exception handlers 435 and 436. In step 315, an exception set-up handler 437 is provided for the purpose of setting up the use of the exception handlers 435 and 436. The exception set-up handler 437, once invoked, is responsible for setting up debug registers according to the present invention, such that the encapsulated critical code segments 412 and 414 in the exception handlers 435 and 436 are executed at appropriate times during the execution of the remaining code, namely code segments 411, 413, and 415.

According to the present invention, the execution flow that was part of the original software program 401 is maintained, but the code in the exception handlers 435 and 436 is executed within the kernel-level exception processing state and is not visible to a user-level debugger, and not readily visible to a kernel-level debugger.

As explained below, one of the functions of the exception set-up handler 437 is to set up the debug registers such that the exception handlers 435 and 436 execute at exactly the right point in the program execution flow. Specifically, the exception handler 435 should be executed immediately prior to the first instruction in code segment 413, because the exception handler 435 was removed from the original program 401 just prior to that point in the program execution flow. Thus, the exception handler 435 uses instruction address 441, the starting address of code segment 413, as the address at which the exception handler 435 is to be invoked. Likewise, instruction address 442 is used as the address at which the exception handler 436 is to be invoked. Note that an exception prevents the instruction at the exception address from completing execution. This allows the exception handler to be inserted before the execution of this instruction. When the kernel returns control to this instruction, the instruction is restarted and allowed to complete normally. Thus, the exception address is always the next instruction to be executed after the exception routine executes.

Finally, in step 316, an in-line code segment 432 is provided and inserted into the first code segment 411 for the purpose of invoking the exception set-up handler 437. For the purpose of obfuscation of program flow execution, the in-line code segment 432 should be inserted such that it is difficult to locate by a user attempting to analyze the program. For example, the in-line code segment 432 can be located some number of levels below the main program, within a subroutine. The more levels below the main program the in-line code segment 432 is placed, the harder it will be to locate. Wherever inserted, the in-line code segment 432 must execute prior to the point in the program flow where any of the code encapsulated within the exception handlers 435 and 436 was removed. Specifically, the in-line code segment 432 must execute prior to the first instruction 441 of code segment 413.

An alternate embodiment is described below in which the function of the in-line code 432 and the exception set-up handler 437 is implemented using a kernel-level driver 1201, shown in FIG. 12. As used herein, a kernel level driver 1201 is a code module that performs an interface function between user-level program code and system functions or hardware that can typically best or only take place at kernel-level. These modules are accessed via standard software subprogram calling mechanisms. The kernel-level driver 1201 is invoked within code segment 411 in place of in-line code segment 432 prior to the first instruction 441 of code segment 413. To increase program flow obfuscation, the functions described in FIG. 12 are preferably embedded within other driver functions, rather than the kernel-level driver simply comprising only the functions shown. This alternate embodiment will be described in more detail herein below.

Referring again to FIG. 4b showing the obfuscated program code 421, the execution of the obfuscated program code 421 that a user would see from a debugger will now be described. In this example, the program flow viewed by the debugger would begin with program code segment 411 immediately followed by code segment 413 immediately followed by code segment 415. However, the results of the program execution would be from the execution of all five program segments 411, 412, 413, 414, and 415 in sequence. At points unknown to the debugger and user, the program state, data structures, processor register values, etc. would be changed by the code in program segments 412 and 414, encapsulated in the exception handlers 435 and 436, respectively. There would, however, be no evidence of any program execution from which these changes were computed from the view of the debugger. Thus, the program segments 412 and 414 have been hidden from the user and debugger, and the overall program execution flow of the original program code 401 has been obfuscated according to the present invention.

Although in the example above, only two program segments are shown being obfuscated, as few as one, and as many segments as are supported by the microprocessor hardware debug registers directly may be obfuscated. For the popular Intel X86 architecture, for example, which is used in all PC's directly running the Microsoft Windows Operating System, there are only four available debug registers that can be used according to the present invention. The more recent 64-bit Intel architecture includes more than 4 such registers. Alternately, other means, one of which is described herein below, are available for the extension of the hardware resources using software, allowing more segments to be obfuscated than are directly supported by the hardware debug registers in the microprocessor.

Figure 5:
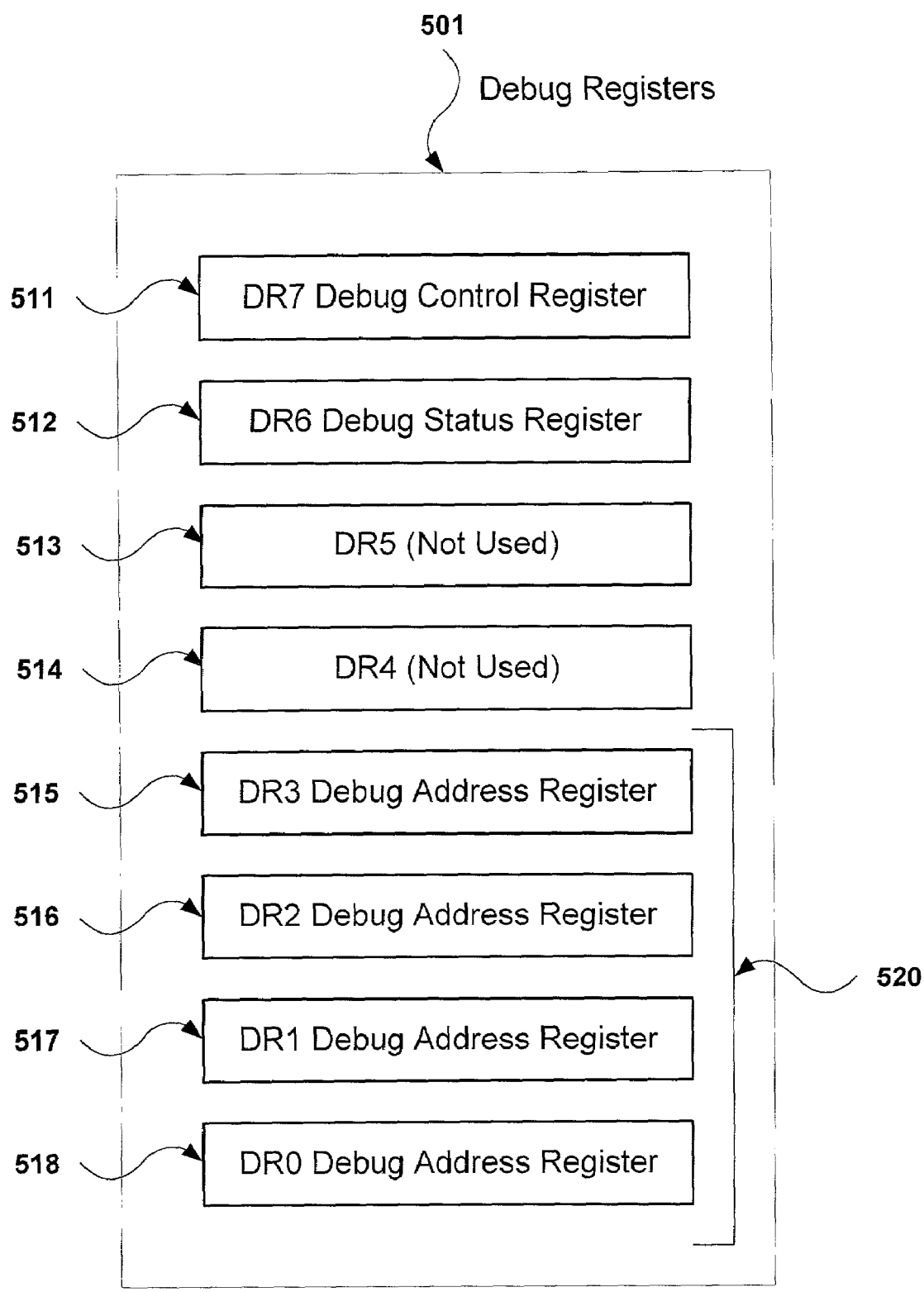
FIG. 5 is a diagram of the Pentium processor family debug registers used to implement the present invention.

Referring now to FIG. 5, a diagram of the Intel Pentium processor family debug registers used to implement the present invention is shown. The Intel Pentium processor family debug registers include four debug address registers 520 labeled DR0 through DR3 (blocks 518, 517, 516, and 515 respectively), a debug status register 512 and a debug control register 511. Referring to both FIGS. 4b and 5, to effectively alter the program flow, the exception set-up handler 437 places the physical address 441 and 442 in the example above in two of the debug address registers to effect an execution flow exception at that address. This break in execution flow is called a debug exception. The debug control register 511 is used to specify to the Operating System 213 and microprocessor hardware 113 how to use the debug address registers 520. Specifically, there are exception enable bits, instruction size bits, and exception type bits for each of the four debug address registers 520. One function of the exception set-up handler 437 is to cause these registers to be set properly to generate instruction fetch exceptions for instruction addresses 441 and 442, resulting in respective invocations of the exception handler 435 for an exception from address 441, and exception handler 436 for an exception from address 442. The details of this process are well known to those with ordinary skill in the art, and thus will not be described in more detail herein.

Figure 6:
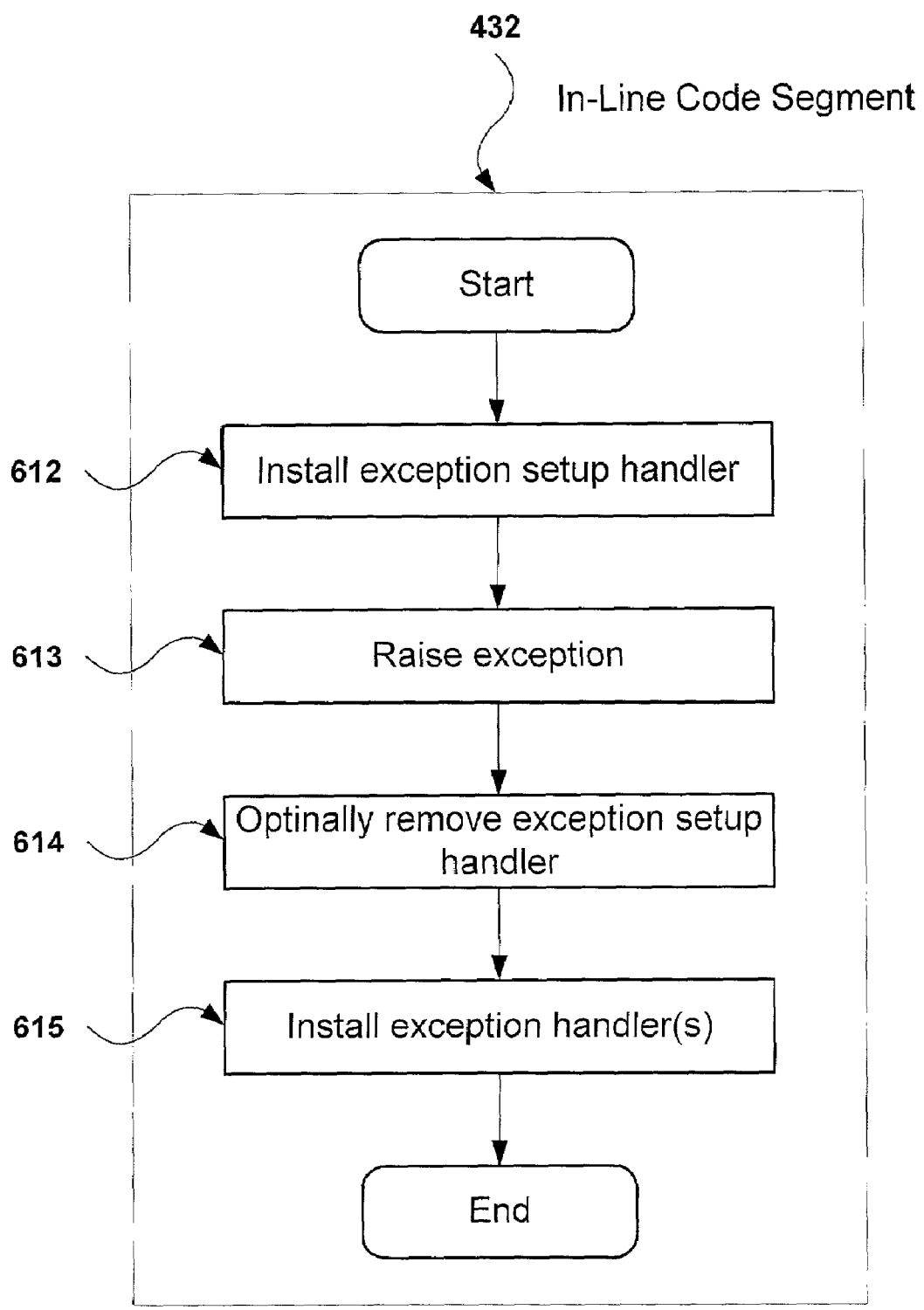
FIG. 6 is a flow chart illustrating the process the in-line code segment uses to implement the present invention.

Referring now to FIG. 6, a flow chart illustrating the process the in-line code segment 432 uses to implement the present invention is shown. In the first step 612, the in-line code segment installs the exception set-up handler 437 on an exception handler linked list (not shown) for the current thread. This is accomplished by placing the exception handler entry address in a linked list which was initialized by the Operating System 213 and which is made available to the Software Program 215. A linked list is well known to those with ordinary skill in the art, and thus will not be described in more detail herein.

Next, in step 613, an appropriate exception is raised to the Operating System 213, causing the Operating System 213 and Kernel 212 to hand control to the initial exception handler on the linked list. Since the list is "last in, first execute," the exception set-up handler 437 is the first to gain control, and execute. After execution of the exception set-up handler 437, control returns to the in-line code segment 601 via Operating System 213 and Kernel 212.

As described above, during the time from the exception and the invocation of the exception set-up handler, program execution occurs at kernel-level. The exception set-up handler 437 executes at user-level. When the exception set-up handler 437 returns control to the Operating System 213, kernel-level is resumed, until finally control is returned to the in-line code segment 601 at user-level. It is important to note that a debugger normally will not follow the execution through this complex path, and that the user-level code executing within the exception handler 437 will be thus obfuscated.

Next, the exception set-up handler 437 is optionally removed from the linked list in step 614. The advantage of doing this is to keep its existence on the linked list as brief as possible, thus reducing the opportunity to discover its function and purpose. The invention will operate correctly with or without the removal step, however.

Finally, each of the exception handlers 435 and 436 are inserted into the linked list in no specific order of insertion. When an exception occurs (on the current thread), each properly written exception handler will determine if the current exception is in fact the exception it is designed to handle. If the current exception is not the one desired, the exception handler hands control of exception processing to the next exception handler on the linked list. In this way, control is handed down the linked list until the appropriate exception handler is found to properly handle the current exception.

Figure 7:
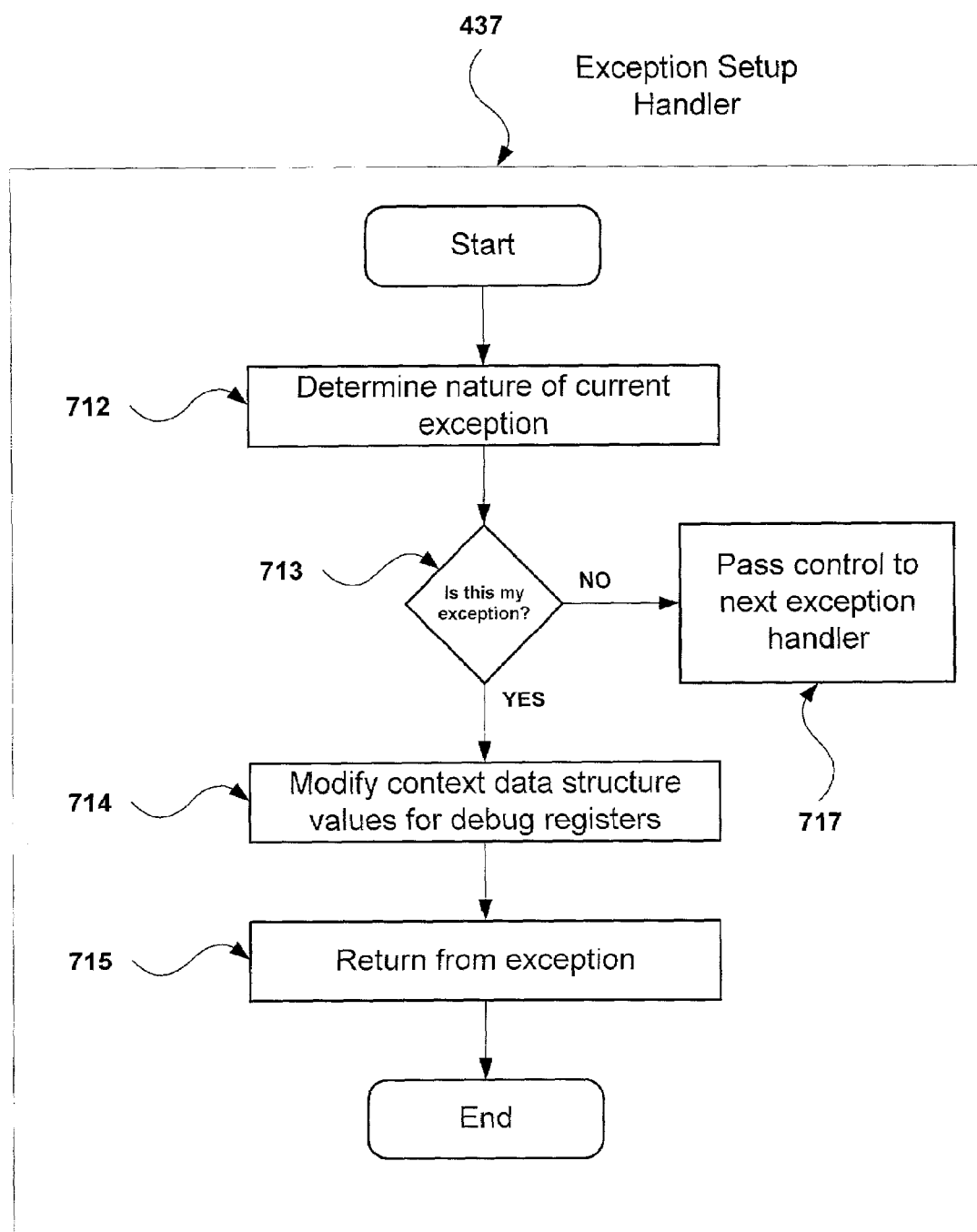
FIG. 7 is a flow chart illustrating the processing the exception set-up handler uses to implement the present invention

Referring now to FIG. 7, a flow chart illustrating the processing the exception set-up handler uses to implement the present invention is shown. Beginning in step 712, the exception set-up handler 701 determines the nature of the current exception. This is accomplished by the exception set-up handler 701 examining the information provided by the Operating System 213, and optionally the contents of the debug status register 512 and debug address registers 520. In step 713, it is determined if the current exception is one for which this exception handler 437 was created to handle. If not, control continues to step 717, where program control is passed to the next handler on the linked list of exception handlers.

If the current exception is one for which this exception handler 437 was created to handle, then in step 714 a context data structure, which is made available to the exception handlers by the Kernel 212, is modified appropriately. The context data structure is a block of memory accessed via a pointer, and includes information about the exception, including register contents and the exception type. In step 714, the values in appropriate registers in the data structure are modified such that the Kernel 212 will set the debug registers 501 to the desired values when the exception processing completes. Optionally, additional registers in the context data structure may be modified, such as the return address for the current exception. This option will be described in more detail herein below.

Finally, in step 715, control is returned to the Kernel 212 and Operating System 213. At this time, the Kernel 212 utilizes the context data structure to set the debug and other microprocessor registers accordingly, and program control reverts back to the Software Program 215.

Figure 8:
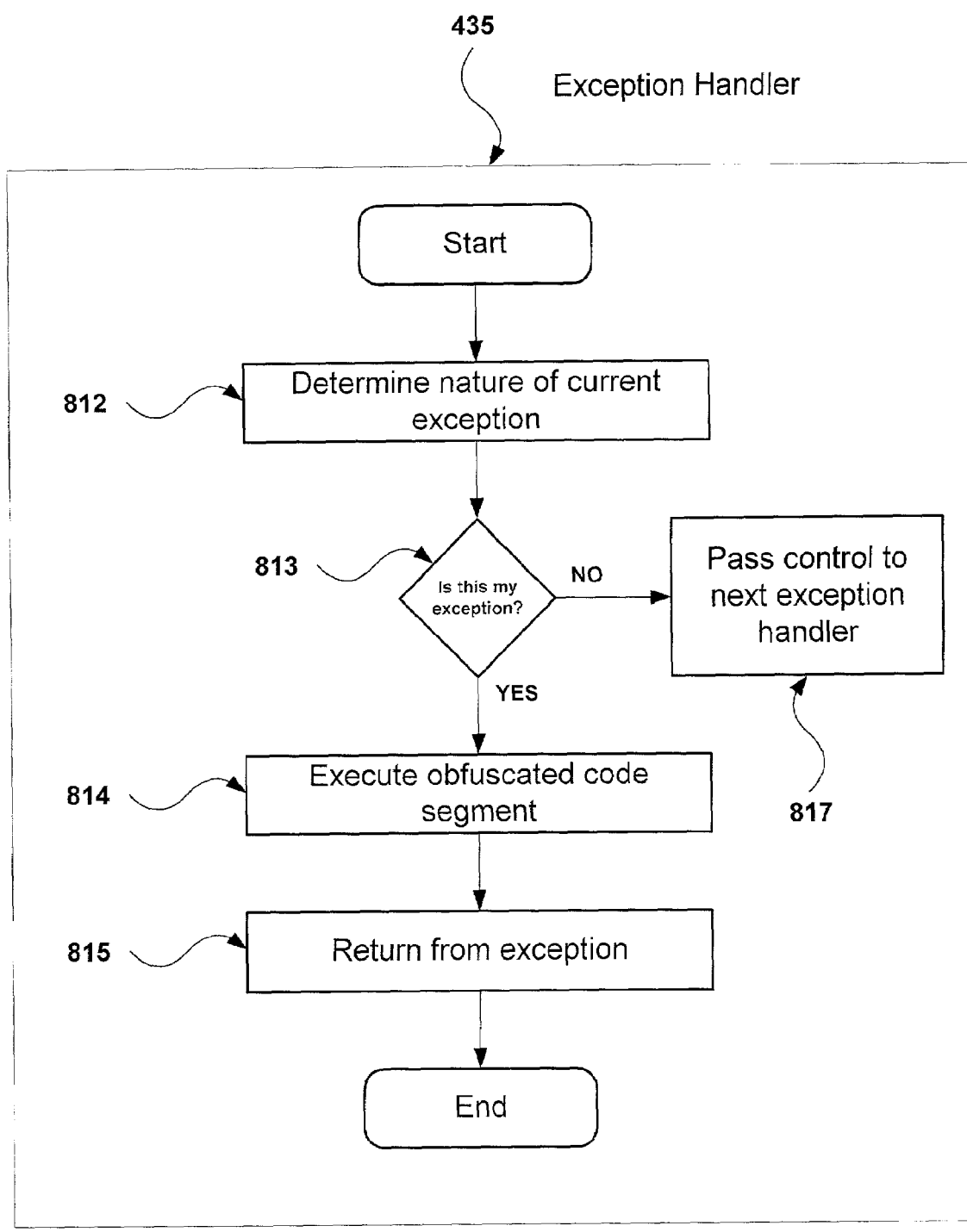
FIG. 8 is a flow chart illustrating the process that an exception handler uses to obfuscate the program execution flow.

Referring to FIG. 8, a flow chart illustrating processing the exception handlers use to obfuscate program execution flow is shown. Beginning in step 812, the exception handler 435 or 436 determines the nature of the current exception. This is accomplished by examining the information provided by the Operating System 213, and optionally the contents of the debug status register 512 and debug address registers 520. In step 813, it is determined if the current exception is one for which this exception handler 435 or 436 was created to handle. If not, control continues to step 817, where program control is passed to the next handler on the linked list of exception handlers.

If the current exception is one for which this exception handler 435 or 436 was created to handle, then in step 814 the included code segment 412 or 414 is executed normally. Finally, in step 815, control is returned to the Kernel 212. At this time, the Kernel 212 utilizes the context data structure to set the debug and other microprocessor registers accordingly, and returns program control back to the program code 421 at the specified exception address 441 or 442. The obfuscated code segment 412 or 414 therefore has been executed in the appropriate precise location within the program flow of the original program code 401, but its execution has occurred bracketed between kernel-level routines as described earlier herein, thus obfuscating the existence of the code segment 412 and 414 from the debugger.

Referring now to FIG. 12, a flow chart illustrating an alternate embodiment kernel-level driver for implementing the functions of the in-line code segment and the exception set-up handler is shown. Execution begins in step 1212, where the context data structure is modified appropriately as described in step 714 above. Next, in step 1213, the exception handlers(s) are installed as described in step 615 above. Finally, in step 1214, control is returned to the calling program, in this case, program segment 411. Other variations will be obvious to those with ordinary skill in the art, and will not be described herein.

Figure 9:
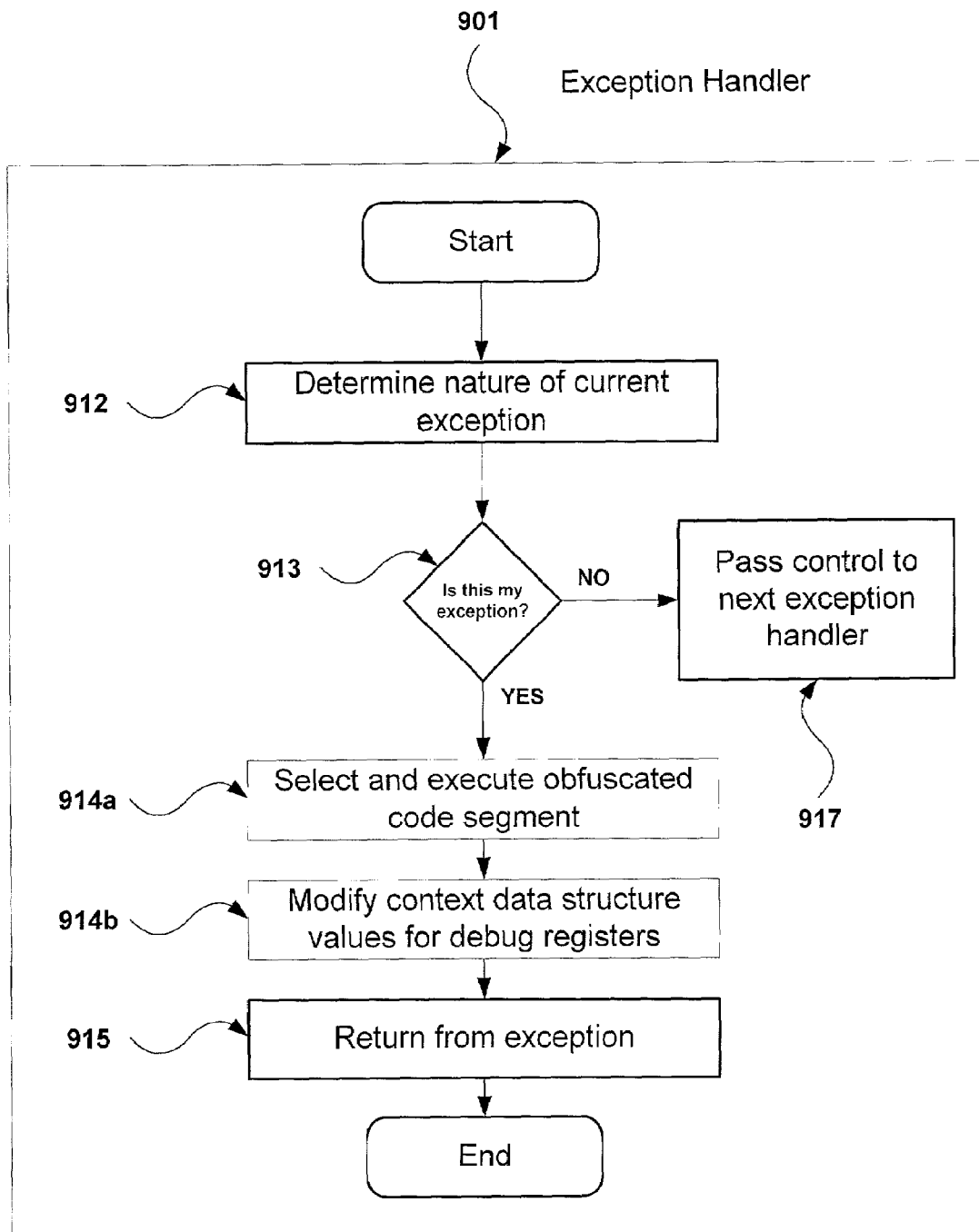
FIG. 9 is a flow chart illustrating an alternate embodiment of the first exception handler used to extend to available resources beyond that provided by the microprocessor hardware.

One alternate embodiment for extending the capabilities of this invention beyond those made available by the hardware registers in the microprocessor will be described. FIG. 9 is a flow chart illustrating the process of the exception handler when used to extend available resources beyond that provided by the microprocessor hardware. This diagram is identical to FIG. 8 with the exception of the shaded blocks 914a and 914b replacing block 814. In step 914a, one of a plurality of obfuscated code segments is selected and executed, based on the information from step 912. This information includes the exception address from the Operating System 213 and optionally the debug registers 501. Next, in step 914b, the available context data structure is modified appropriately to generate an exception at the appropriate address for the next of the plurality of obfuscated code segments to be run. Control is then returned to the Kernel 212 to complete the exception processing. The debug registers are modified by Kernel 212 based on the changes to the context data structure, such that the next obfuscated code segment will be inserted at the appropriate location in the program code by way of a debug exception at that address. This method allows the addition of any number of code segments to be obfuscated using the present invention.

The technique of modifying the debug registers during the execution of the exception handler described herein can also be used to "daisy chain" any number of exception handlers. One method is for all the exception handlers to be installed initially by the in-line code 432 and the exception set-up handler 437, or by kernel-level driver 1201. A second method is to install follow-on exception handlers onto the exception linked list by previously executing exception handlers. In either case, it is necessary to set up for changes to the debug registers appropriately prior to returning control to the kernel 212 such that the follow-on exception handler will be invoked from the appropriate address.

Another alternate embodiment is to randomly position the remaining, non-obfuscated code segments such that they are not positioned in the order of execution, and to utilize the ability to change the return address in the exception handler such that execution continues not at the location of the exception but at a different address.

Figure 10:
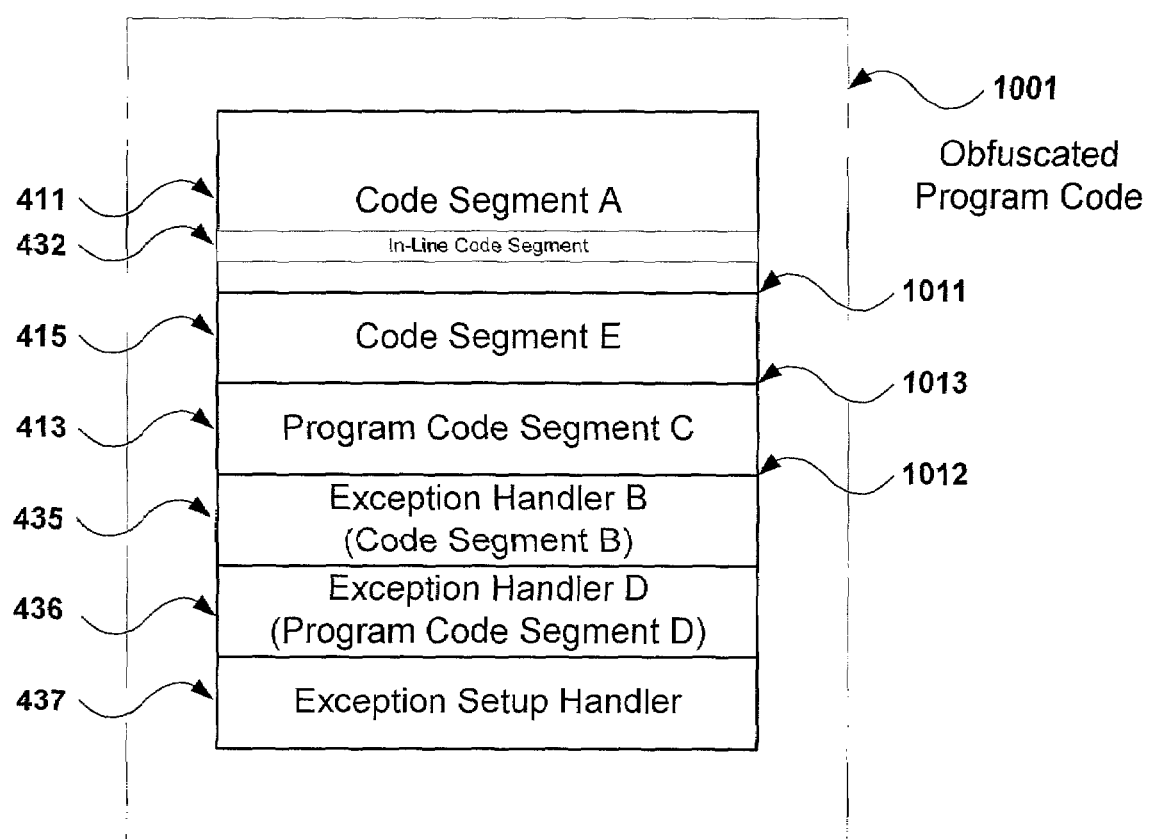
FIG. 10 is a flow chart illustrating an alternate embodiment of the present invention for scrambling the order of program code segments.

FIG. 10 is a block diagram of the program code 401 after obfuscation using this alternative technique. Note that Program Code Segment E, block 415, and Program Code Segment C, block 413, have been placed out of order in the final obfuscated code 1001. In other words, rather than being placed in the order A, C, E, they are placed in the order A, E, C. The required exception addresses for this configuration of the program code are exception addresses 1011 and 1012. An additional address 1013 is required as a return address. Address 1011 also operates as a return address, as described herein below.

Program execution begins with program segment 411, as usual. When exception address 1011 is reached, exception handler 435 is invoked. However, return address 1011 is not appropriate. The next segment of code that must be executed to maintain proper program flow is program code segment 413, which begins at address 1013. Thus, address 1013 is utilized as the return address from exception handler 435. After program segment 413 executes, exception address 1012 is encountered, causing the invocation of exception handler 436. Again, the return address 1012 is not appropriate for exception handler 436. Rather, to continue proper program flow return address 1011 is required. When exception handler 436 completes execution, program segment 415 is executed. Program execution completes at the end of program segment 415.

These new values for the return address from the exception handlers 435 and 436 will cause the program flow to exhibit strange characteristics. Specifically, the debugger and user will view the execution of block 411, then 413, then 415. However, the expected order of execution will be 411, 415, and 413, based on the placement of the code. This is an additional tool for obfuscation program execution flow that is available using the present invention.

Figure 11:
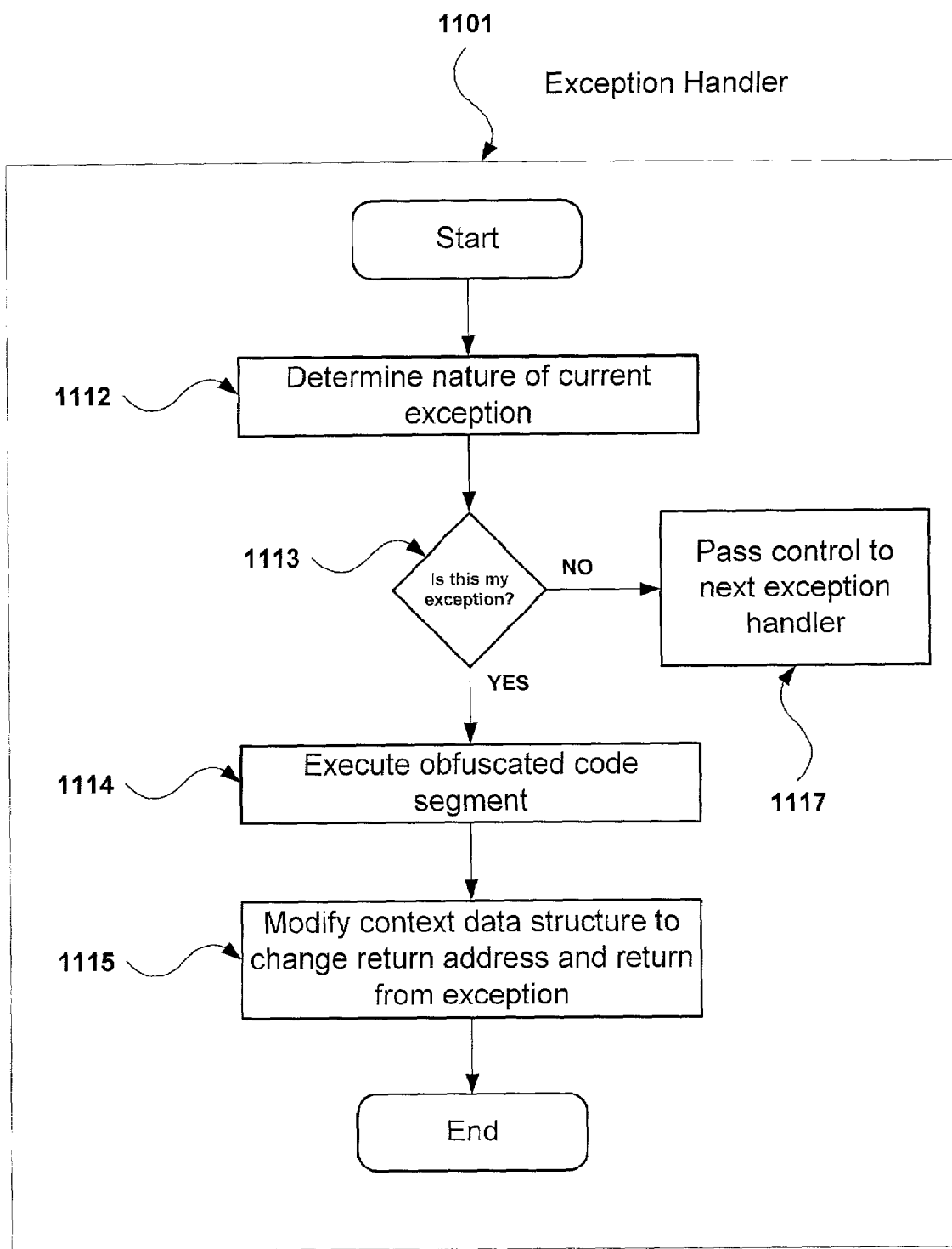
FIG. 11 is a flow chart illustrating an alternate embodiment of the first exception handler to accomplish program obfuscation with rearranged code segments

FIG. 11 is a flow chart illustrating an alternate embodiment of the exception handler to accomplish program obfuscation with rearranged code segments. FIG. 11 is identical to FIG. 8, with the exception of the change in the final step 1115. In this step, the context data structure is modified to change the return address according to the description above, prior to returning control to the kernel 212.

Finally, in another alternate embodiment, it is possible to create exceptions within exceptions. Thus, during the execution of the obfuscated code 814 in FIG. 8, an exception can be made to occur, using the same technique herein described, causing a different exception handler to be run. Once completed, control would return to the obfuscated code 814 and processing would continue. This technique can be extended to multiple levels, as desired. This is an additional tool for obfuscation of program execution flow that is available using the present invention.

Although the present invention has been described in accordance with the embodiments shown, one with ordinary skill in the art will readily recognize that there could be variations to the embodiments and combinations thereof, and those embodiments and combinations would be within the spirit and scope of the present invention. For example, several of the embodiments can be combined to provide a more complex entangling of the code sequencing via modified return addresses and multiple level exceptions. Additionally, the present invention, although described within the context of the Intel processor family and the Microsoft Windows Operating System, is also applicable to all other microprocessor families and most modern operating systems. Accordingly, one with ordinary skill in the art may make many modifications without departing from the spirit and scope of the appended claims.

What is claimed is:

1. A method for obfuscation of computer program execution flow to increase computer program security, the method comprising:
   (a) partitioning the computer program into one or more non-critical code segments and one or more critical code segments to be obfuscated;
   (b) removing at least one of the critical code segments and embedding the critical code segments within one or more exception handlers;
   (c) providing the computer program with an exception set-up handler to set up operation of the exception handlers during the execution of the computer program;
   (d) providing the computer program with one or more in-line code segments inserted within at least one of the non-critical code segments, wherein each of the in-line code segments forces an exception when executed and wherein the in-line code segments are placed in the computer program at points where the critical segments need to execute in order to maintain execution flow of the computer program; and
   (e) executing the computer program on a computer having an operating system that provides kernel-level and user-level execution modes, and debug resources to support generation and processing of exceptions at specified addresses, wherein execution flow of computer program is maintained with the non-critical code segments executing in the user-level execution mode, but when one of the in-line code segments is executed, an exception is forced and the kernel-level execution mode is entered whereby control is transferred to the one or more of the exception handlers previously set-up by the exception set-up handler for execution of the critical code segments, and when the exception handlers complete execution, control is returned to non-critical code segments, whereby program execution flow is obfuscated from other programs running in user-level execution mode, thereby increasing difficulty of reverse engineering the computer program.

2. The method of claim 1 wherein the providing (c) further includes: using the set-up handler to initiate a set-up of debug registers, such that the critical code segments in the exception handlers are executed at appropriate times during execution of the computer program.

3. The method of claim 2 wherein the providing (b) further includes: inserting each of the exception handlers into the linked list.

4. The method of claim 3 further including: when one of the exceptions is raised to the operating system, handing control down the linked list until one of the exception handlers determines that the exception is one that the exception handler is designed to handle.

5. The method of claim 4 further including: if the exception is one for which the current exception handler was designed to handle, executing the critical code segment included in the current exception handler.

6. The method of claim 5 further including: if the exception is one for which the exception set-up handler was designed to handle, setting a return address for the exception set-up handler when the exception processing completes.

7. The method of claim 6 further including: modifying debug registers during execution of the exception handlers such that any number of exception handlers may be daisy chained.

8. The method of claim 1 wherein the providing (d) further includes: executing the in-line code segment prior to a point in the program flow where any of the critical code segments was removed for placement into the exception handlers.

9. The method of claim 8 further including: using the in-line code segment to install the exception set-up handler on an exception handler linked list for a current thread, such that when one of the exceptions occurs, the operating system hands control to the exception set-up handler for execution.

10. The method of claim 9 further including: removing the exception set-up handler from the linked list after execution.

11. The method of claim 1 wherein the embedding (b) further includes providing entry code for the exception handlers to determine a nature of the exception.

12. The method of claim 11 further including handling the exception if the nature of the exception is applicable to a first exception handler, otherwise handing exception processing to the next available exception handler.

13. The method of claim 1 further including obfuscating the critical code segments to hide anti-piracy algorithms.

14. The method of claim 1 further including providing code for the exception handlers to modify a return address to be used after completion of the exception processing.

15. The method of claim 14 further including rearranging non-critical code segments out of normal execution order, and setting exception addresses and return addresses to ensure proper program sequencing to further obfuscate the program execution flow.

16. The method of claim 1 further including code within the exception handlers to modify exception conditions to support future exceptions.

17. The method of claim 16, further including embedding a plurality of critical code segments within at least one of the exception handlers.

18. The method of claim 17, further including selecting which of a plurality of critical code segments within the at least one exception handler should be executed based on exception information.

19. The method of claim 16, further including embedding one or more exception handlers into other exception handlers to further obfuscate the program execution flow.

20. A method for obfuscation of computer program execution flow to increase computer program security, the method comprising:
(a) partitioning the program into one or more non-critical code segments and one or more critical code segments;
(b) obfuscating at least one of the critical code segments by removing the critical code segments and embedding each of one of the critical code segments within one or more exception handlers;
(c) providing the computer program with a driver to set up operation of the exception handlers during execution of the computer program;
(d) providing the computer program with one or more in-line code segments inserted within at least one of the non-critical code segments, wherein each of the in-line code segments forces an exception when executed and wherein the in-line code segments are placed in the computer program at points where the critical segments need to execute in order to maintain execution flow of the computer program; and
(e) executing the computer program on a computer having an operating system that provides kernel-level and user-level execution modes, and debug resources to support generation and processing of exceptions at specified addresses, wherein execution flow of computer program is maintained with the non-critical code segments executing in the user-level execution mode, but when one of the in-line code segments is executed, an exception is forced and the kernel-level execution mode is entered whereby control is transferred to the one or more of the exception handlers previously set-up by the driver for execution of the critical code segments, and when the exception handlers complete execution, control is returned to non-critical code segments, whereby program execution flow is obfuscated from other programs running in user-level execution mode, thereby increasing difficulty of reverse engineering the computer program.

21. The method of claim 20 wherein the providing (c) further includes: using the driver to initiate a set-up of debug registers, such that the critical code segments in the exception handlers are executed at appropriate times during execution of the computer program.

22. The method of claim 21 further including: executing the driver prior to a point in the program flow where any of the critical code segments was removed for placement into the exception handlers.

23. The method of claim 21 wherein the providing (b) further includes: inserting each of the exception handlers into a linked list.

24. The method of claim 23 further includes: when one of the exceptions is raised to the operating system, handing control down the linked list until one of the exception handlers determines that the exception is one that the exception handler is designed to handle.

25. The method of claim 24 further includes: if the exception is one for which the current exception handler was designed to handle, executing the critical code segment included in the current exception handler.

26. The method of claim 25 further including: modifying debug registers during execution of the exception handlers such that any number of exception handlers may be daisy chained.

27. The method of claim 25, further comprising providing code for the exception handlers to modify the return address to be used after completion of the exception processing.

28. The method of claim 27, further comprising rearranging the none-critical code segments out of normal execution order, and setting exception addresses and return addresses to ensure proper program sequencing to further obfuscate the program execution flow.

29. The method of claim 25, further comprising including code within the exception handlers to modify exception conditions to support future exceptions.

30. The method of claim 29, further comprising including a plurality of critical code segments within at least one of the exception handlers.

31. The method of claim 30, further comprising selecting which of a plurality of critical code segments within the at least one exception handler should be executed based on exception information.

32. The method of claim 25, further comprising embedding one or more exceptions within one or more other exception handlers, to further obfuscate the program execution flow.

33. The method of claim 32, further comprising repeating the embedded exceptions within exception handlers such that required exception processing occurs at a plurality of exception processing levels, to further obfuscate the program execution flow.

34. The method of claim 20 wherein the providing (b) further includes providing entry code for the exception handlers to determine a nature of the exception.

35. The method of claim 34, further comprising handling the exception if the nature of the exception is applicable to a first exception handler, otherwise handing exception processing to the next available exception handler.

36. The method of claim 20, further comprising selecting from the one or more code segments the segments to obfuscate within the exception handlers based on a value of obfuscating the algorithms within the segment.

37. The method of claim 20, further comprising including additional, unrelated driver code within the driver to further obfuscate the operation of the program execution flow.

38. A system for obfuscation of program execution flow, comprising:
a computer system including a processor, memory, an operating system that provides kernel-level and user-level execution modes, and debug resources to support the generation and processing of exceptions at specified addresses; and
an obfuscated program comprising;
one or more non-critical code segments,
a plurality of code segments determined to be critical code segments that have been removed and embedded within one or more exception handlers, wherein the exception handlers are provided as part of the obfuscated program,
one or more in-line code segments inserted within at least one of the non-critical code segments, wherein each of the in-line code segments forces an exception when executed and wherein the in-line code segments are placed in the obfuscated program at points where the critical segments need to execute in order to maintain execution flow of the computer program, and
a set-up handler for setting up execution of the exception handlers by setting up the debug resources,
wherein when the computer system executes the program, execution flow of program is maintained with the non-critical code segments executing in the user-level execution mode, but when one of the in-line code segments is executed, an exception is forced and the kernel-level execution mode is entered whereby control is transferred to the one or more of the exception handlers previously set-up by the set-up handler for execution of the critical code segments, and when the exception handlers complete execution, control is returned to non-critical code segments, whereby program execution flow is obfuscated from other programs running in user-level execution mode, thereby increasing difficulty of reverse engineering the computer program.

39. A method for obfuscation of computer program execution flow to increase computer program security, the method comprising:
(a) partitioning the computer program into one or more non-critical code segments, and one or more critical code segments to be obfuscated;
(b) removing from the computer program, at least one of the critical code segments and embedding the removed critical code segments within one or more exception handlers, wherein the exception handlers run under kernel-level execution mode of a computer's operating system;
(c) adding to the computer program, the exception handlers and code for setting-up the exception handlers during the execution of the program;
(d) adding to the computer program, code for forcing an exception when executed at each location in the computer program where the critical code segments were to be invoked in the computer program prior to removal; and
(e) executing the computer program on the computer having an operating system that provides kernel-level and user-level execution modes, wherein execution flow of computer program is maintained where the non-critical code segments execute in the user-level execution mode, and when each location in the computer program previously occupied by the critical code segments is encountered, an exception is forced by execution of the code previously added for the exception-forcing and the kernel-level execution mode is entered whereby control is transferred to the one or more exception handlers previously set up by the code for setting up the exception handlers, for execution of the critical code segments, and when the exception handlers complete execution, control is returned to the non-critical code segments, whereby program execution flow is obfuscated from other programs running in user-level execution mode, thereby increasing difficulty of reverse engineering the computer program.

* * * * *